United States Patent [19]

Tuma

[11] Patent Number: 5,140,753
[45] Date of Patent: Aug. 25, 1992

[54] INCLINOMETER FOR UNDERGROUND STORAGE TANKS

[75] Inventor: John E. Tuma, Friendswood, Tex.

[73] Assignee: Tanknology Corporation International, Houston, Tex.

[21] Appl. No.: 833,306

[22] Filed: Feb. 10, 1992

[51] Int. Cl.⁵ .............................. G01C 9/10
[52] U.S. Cl. ........................ 33/365; 33/334
[58] Field of Search ............. 33/354, 353, 809, 544.1, 33/544.2, 542.1, 544, 1 H, 304, 313, 343, 365, 379, 334

[56] References Cited

U.S. PATENT DOCUMENTS 3,492,739 2/1970 Boyce ..................... 33/365
4,434,558 3/1984 Face et al. ............... 33/366 X Primary Examiner—Harry N. Haroian
Attorney, Agent, or Firm—Vaden, Eickenroht, Thompson, Boulware & Feather

[57] ABSTRACT

Apparatus for sensing the deviation of an underground storage tank from level which is conveniently referred to as a tank inclinometer. The apparatus, or inclinometer, includes an elongate member having a feeler bar mounted to the end thereof which is aligned with the elongate members for insertion through the restricted opening of the fill neck of an underground storage tank and then pivoted to a position such that, when the elongate members are pulled upwardly, the feeler bar contacts the inside top surface of the underground storage tank. Deviations of the top surface of the tank from level are sensed and an output provided by which the deviation is observed by the operator.

7 Claims, 1 Drawing Sheet

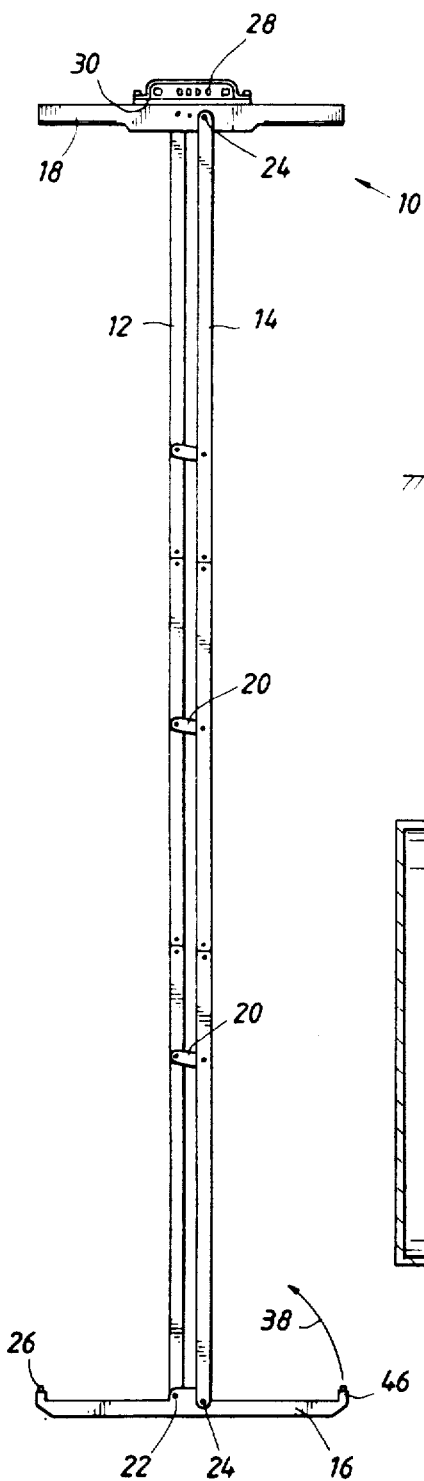
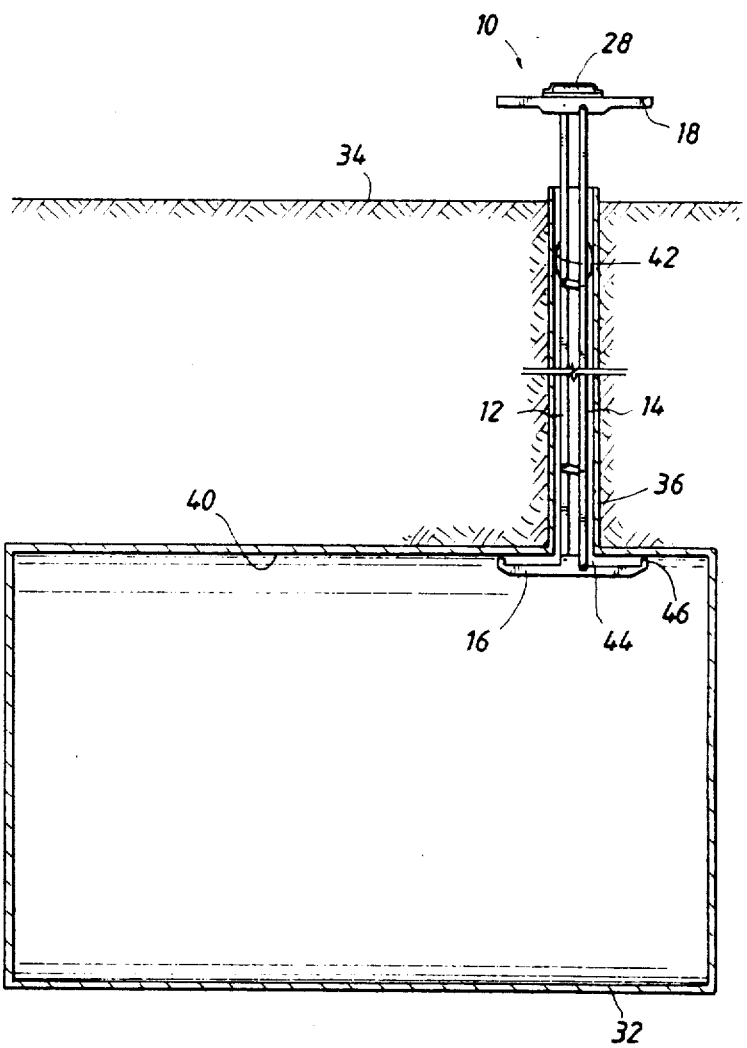

INCLINOMETER FOR UNDERGROUND STORAGE TANKS

BACKGROUND OF THE INVENTION

The present invention relates to an apparatus and method for sensing the tilt of an underground storage tank (UST). In more detail, the present invention relates to a method and apparatus capable of sensing, from above ground, any deviation from level of an underground storage tank.

Although reference will be made throughout this specification to the testing of gasoline storage tanks because such tanks are the most common application of the method and apparatus of the present invention and the Patent Statute requires the disclosure of the preferred embodiment of the invention, those skilled in the art will recognize from this disclosure that the present invention is capable of application to any underground storage tank regardless of the type of liquid stored therein and/or the particular business in connection with which the UST is operated.

By federal regulation (53 C.F.R. §§280 et seq.), the amount of gasoline pumped from an underground gasoline storage tank must continually be reconciled with the volume of gasoline in the tank and the volume of gasoline pumped into the tank. To do so, the filling station operator drops a dipstick into the tank through the tank fill pipe to measure the depth of the gasoline in the tank. Of course, for such a measurement to be an accurate indicator of the volume of gasoline contained in the tank, the gasoline in the tank must be of uniform depth throughout the tank. However, variations in the shape of the tank caused by the installation of the tank, changing temperature, water table depth, and other ambient conditions, and the volume of the liquid in the tank decrease the likelihood of uniform depth of the gasoline stored therein. Tank manufacturers supply a chart, referred to as a strapping chart, by which the volume of the liquid in the tank can be more accurately calculated by measurement of the depth of the liquid, but even the most carefully installed tank and the most accurate strapping charts will not provide accurate volume calculations if the tank is not level. Further complicating matters is that, in an ideal installation, the tank is installed with a tilt toward the end of the tank into which the fill pipe opens. This tilt amounts to approximately a 4" difference in the height of one end of the tank, compared to the other, along the length of a standard right angle cylinder ten thousand gallon tank. Of course given the volume of liquid contained in such a tank, such a tilt can throw off the volume calculation from a measurement of the depth of the liquid in the tank by perhaps as much as a 100 gallons or more. Such variation is undesirable economically and can cause regulatory problems because federal regulations require that a tank be capable of being reconciled to within one percent (1%) of the total volume of the UST (±130 gallons); otherwise, it must be taken out of service.

There is, therefore, a need for an apparatus and method capable of sensing any deviation from level and further, for quantifying that deviation so that the strapping chart for an individual tank can be corrected to account for that tilt so as to provide more accurate inventory reconciliation and volume calculation from measurement of the depth of liquid in the tank. It is a primary object of the present invention, therefore, to provide such an apparatus and method. Other objects, and the advantages, of the invention will be apparent to one skilled in the art from the following description of a presently preferred embodiment thereof.

SUMMARY OF THE INVENTION

These objects are met by providing an apparatus for sensing deviation of an underground storage tank from level comprising first and second, side-by-side elongate members with a feeler bar pivotally mounted to the first end of each of the elongate members and a handle pivotally mounted to the other end of each of the elongate members that is substantially parallel to the feeler bar, thereby forming a collapsible parallelogram with the elongate members and feeler bar. An operator grips the handle and pivots the handle to pivot the feeler bar from a first position substantially parallel to the elongate members for inserting the feeler bar on the first end of the elongate members through the restricted opening of the fill pipe of an underground storage tank to a second position substantially perpendicular to the elongate members by pivoting the handle from a position substantially parallel to the elongate members to a position substantially perpendicular to the elongate members. Means is mounted on the handle for sensing deviation of the handle from level when the feeler bar is pivoted to the second position after being inserted into the underground storage tank and drawn upwardly against the inside of the top of the tank to sense a deviation from level of the underground storage tank.

Also provided is a method of sensing the deviation of an underground storage tank from level comprising the steps of pivoting a handle that is pivotally mounted at one end of two substantially parallel elongate members having a feeler bar pivotally mounted to the other end thereof and substantially parallel to the handle so as to align the handle and the feeler bars substantially parallel to the elongate members, inserting the end of the elongate members having the feeler bar mounted thereto into the fill pipe of an underground storage tank far enough to position the feeler bar in the underground storage tank, and pivoting the handle to a position substantially perpendicular to the elongate members, thereby also pivoting the feeler bar to a position substantially perpendicular to the elongate members. The handle is then pulled upwardly to contact the inside of the top of the underground storage tank and any deviation of the handle from level is sensed.

BRIEF DESCRIPTION OF THE DRAWINGS

FIG. 1 is an elevational view of a presently preferred embodiment of an apparatus constructed in accordance with the present invention.

FIG. 2 is a schematic representation of the apparatus of FIG. 1 in operation in accordance with the method of the present invention.

DETAILED DESCRIPTION OF THE PREFERRED EMBODIMENTS

Referring to the figures, there is shown an apparatus, indicated generally at reference numeral 10, constructed in accordance with the teachings of the present invention. The apparatus, or inclinometer, 10 is comprised of first and second elongate members 12 and 14 having a feeler bar 16 pivotally mounted to the first end thereof. A handle 18 is pivotally mounted to the second end of each of the elongate members 12 and 14 and is substantially parallel to the feeler bar 16 so as to form a collapsible parallelogram with the elongate members 12 and 14 and the feeler bar 16. By gripping the handle 18, an operator pivots the feeler bar 16 from a first position in which the feeler bar is substantially parallel to the elongate members 12 and 14 to a second position, shown in FIG. 1, in which the feeler bar 16 is substantially perpendicular to the elongate members 12 and 14. By pivoting the handle 18 from a position substantially perpendicular to the elongate members 12 and 14 to a position substantially parallel to the elongate members 12 and 14, i.e., in the direction of arrow 38, the cross-sectional dimension of the apparatus 10 is reduced to a point that the feeler bar 16 fits through a small diameter opening such as the 4" diameter opening of the filler pipe of an underground storage tank (UST).

In the presently preferred embodiment shown in FIG. 1, each of the elongate members 12 and 14 is comprised of sections 12', 12", etc., which are bolted together to form the apparatus 10. To provide additional rigidity to the apparatus 10 and to help insure that the feeler bar 16 is substantially parallel to the handle 18 at all times, each of the elongate members 12 and 14 is also provided with one or more cross bars 20 pivotally mounted to the respective members 12 and 14. To facilitate the pivoting of the feeler bar 16 from the first position substantially parallel to the elongate members 12 and 14 to the second position substantially perpendicular to the elongate members 12 and 14, the points 22 and 24 at which the elongate members 12 and 14, respectively, are mounted to the feeler bar 16 and handle 18 are offset with respect to each other; in other words, the pivot point 22 is located at a different level on handle 18 and feeler bar 16 than the pivot point 24.

Each of the ends of feeler bar 16 is provided with an adjustable screw 26 which can be set at different heights relative to the feeler bar 16. These screws 26 may be conveniently referred to as leveling screws because, in those tanks in which the tank was installed at ideal tilt from the level, the relative heights of the two screws 26 at each end of the feeler bar 16 are set so that when the screws 26 contact the top of the inside of a storage tank as described below, the level sensing means 28 mounted on handle 18 is effectively "fooled" into measuring that tank as being level.

Level sensing means 28 is mounted to a plate 30 which is integral with the handle 18 so that any deviation of the handle 18 from level is sensed, by the sensing means 28. Level sensing means 28 can be any of a number of known devices for sensing deviation from level such as a bubble in a glass tube or, in the presently preferred embodiment shown in the figures, an electronic readout level sensing apparatus of the type which is sold, for instance, under the trademark "SMART LEVEL" Digital Inclinometer (Wedge Innovations, Sunnyvale, Ca.).

Referring now to FIG. 2, the method of the present invention will now be described. An underground storage tank (UST) is indicated at reference numeral 32, and UST 32 communicates to ground level 34 through a fill pipe 36. In the first step of the method, handle 18 is pivoted so as to align handle 18 and feeler bar 16 substantially parallel to elongate members 12 and 14, i.e., by pivoting feeler bar 16 in the direction of arrow 38 shown in FIG. 1. The end of the elongate members 12 and 14 having the feeler bar 16 mounted thereto is then inserted into the restricted opening of the fill pipe 36 of UST 32 far enough to position the feeler bar 16 in the UST 32, and handle 18 is then pivoted to a position substantially perpendicular to elongate members 12 and 14, thereby pivoting the feeler bar 16 back to the position shown in FIG. 1, i.e., substantially perpendicular to elongate members 12 and 14. As shown in FIG. 2, the handle 18 is then pulled upwardly to cause the adjustment screws 26 of feeler bar 16 to contact the inside of the top 40 of UST 32.

Generally the direction of the long axis of the UST 32 is known such that the handle 18 and feeler bar 16 can be aligned with that axis as shown in FIG. 2. However, even if the direction of the long axis is unknown, the apparatus 10 still allows level sensing operations. Using the handle 18, the operator rotates the apparatus 10 while drawing upwardly on handle 18, the increased resistance to rotation caused by the movement of adjustment screws 26 along the inside surface of the top 40 of the UST 32 and the change in height resulting from the rotation providing the input for locating the long axis of the UST 32 so that any deviation of the handle 18 from level then reflects the deviation of the long axis from level. The adjustment screws 26 can be provided with rollers or coasters to facilitate this rotation if desired.

Preferably, the elongate members 12 and 14 are centered in fill pipe 36 before the deviation of the handle 18 from level is sensed. This centering is accomplished by simply observing the position of the elongate members 12 and 14 in fill pipe 36, or means can be provided, as shown at reference numeral 42, in the form of two opposed bows of metal or other material having a spring tension, mounted to elongate members 12 and 14 for centralizing the elongate members 12 and 14 in fill pipe 36 in much the same manner of a centralizer as known in the art for conducting downhole oil field operations.

As shown at reference numeral 44, many USTs are provided with structure at the point at which the fill pipe and the wall of the top 40 of the UST are joined. This structure 44 may take the form of, for instance, a crimped or welded joint if the UST is made of metal, or a thickened (for reinforcement) area if the UST is made of fiberglass. So as to avoid contact with whatever structure 44 may be present at the point at which the fill pipe 36 and the top of UST 32 are joined and which would affect any level sensing operation, the feeler bar 16 is provided with upright portions 46 at both ends thereof extending in a direction substantially perpendicular to feeler bar 16 and handle 18. In other words, the uprights 46 extend in a direction substantially parallel to the elongate members 12 and 14 when the feeler bar 16 is in the second position substantially perpendicular to elongate members 12 and 14 as shown in FIG. 1. As shown in FIG. 2, these upright portions 46 contact the top 40 of UST 32 even when the structure such as is shown at reference numeral 44 extends downwardly into the UST 32 from the top 40 thereof.

Although described in terms of the above-illustrated presently preferred embodiment, those skilled in the art who have the benefit of this description will recognize that certain changes can be made to the manner in which the component parts thereof function to achieve the intended results. For instance, the sensing element (not shown) of level sensing means 28 could be mounted to the feeler bar 16 with a cable leading upwardly to a read-out mounted on handle 18 for increased accuracy in detecting deviation from level. In such an embodiment, one of the two elongate members 12 and 14 could even be eliminated and the feeler bar 16 spring biased in the direction of arrow 38 (FIG. 1) such that a similar result is achieved. Likewise, tanks other than those which are nominally cylindrical can be tested for deviation from level using the apparatus 10 of the present invention. All such changes are intended to fall within the spirit and scope of the following claims.

What is claimed is:

1. An apparatus for sensing deviation of an underground storage tank from level comprising:
   first and second elongate members;
   a feeler bar pivotally mounted to the first end of each of said elongate members;
   a handle pivotally mounted to the second end of each of said elongate members substantially parallel to said feeler bar to form a collapsible parallelogram with said elongate members and said feeler bar for gripping by an operator to pivot said feeler bar from a first position substantially parallel to said elongate members for inserting the first end of said elongate members, having said feeler bar pivotally mounted thereto, through the restricted opening of the fill pipe of an underground storage tank to a second position substantially perpendicular to said elongate members by pivoting said handle from a position substantially parallel to said elongate members to a position substantially perpendicular to said elongate members, respectively; and
   means mounted on said handle for sensing deviation of said handle from level when said feeler bar is pivoted to said second position after insertion into the underground storage tank and drawn upwardly against the inside of the top of the underground storage tank to sense a deviation from level of the underground storage tank.

2. The apparatus of claim 1 wherein the ends of said feeler bar are provided with adjustable screws for setting at different heights so as to cause said level sensing means to sense deviation from level in an underground storage tank having tilt resulting from the installation thereof.

3. The apparatus of claim 1 wherein said feeler bar is provided with upright portions at the ends thereof extending in a direction substantially perpendicular to said handle for contacting the inside of the top of the underground storage tank while avoiding contact with any structure which may be present at the point at which the fill pipe and the wall of the underground storage tank are joined.

4. The apparatus of claim 1 additionally comprising means for centering said elongate members in the fill pipe of the underground storage tank.

5. The apparatus of claim 1 wherein the points at which said first and second elongate members are pivotally mounted to said handle and said feeler bar are offset for facilitating the pivoting of said feeler bar from said first to said second position.

6. A method of sensing deviation of an underground storage tank from level comprising the steps of:
   pivoting a handle pivotally mounted to one end of two substantially parallel elongate members having a feeler bar pivotally mounted to the other end thereof and substantially parallel to the handle so as to align the handle and the feeler bar substantially parallel to the elongate members;
   inserting the end of the elongate members having the feeler bar mounted thereto into the fill pipe of an underground storage tank far enough to position the feeler bar in the underground storage tank;
   pivoting the handle to a position substantially perpendicular to the elongate members, thereby pivoting the feeler bar to a position substantially perpendicular to the elongate members;
   pulling upwardly on the handle to cause the feeler bar to contact the inside of the top of the underground storage tank; and
   sensing any deviation of the handle from level.

7. The method of claim 6 additionally comprising centering the elongate members in the fill pipe.

* * * * *